Oct. 12, 1943.    R. F. THOMAS    2,331,440
ARTIFICIAL FLOWER STEM
Filed Jan. 2, 1942

Inventor
R. F. Thomas
By L. F. Randolph
Attorney

Patented Oct. 12, 1943

2,331,440

UNITED STATES PATENT OFFICE 2,331,440

ARTIFICIAL FLOWER STEM

Robert F. Thomas, Torrington, Wyo., assignor of one-half to Marian Grace Thomas, Torrington, Wyo.

Application January 2, 1942, Serial No. 425,463

1 Claim. (Cl. 47—55)

This invention relates to a novel construction of artificial flower stems adapted to be applied to natural flowers, from which the stems have been clipped for preparing flowers for corsages and formal bouquets.

It is customary to attach artificial stems to natural flowers by wiring and wrapping with Parafilm which is a tedious operation. The purpose of the invention is to provide an article which can be easily inserted in the calyx of a flower, after the stem has been clipped therefrom, and which will anchor itself in the calyx firmly so as to resist removal.

Other objects and advantages of the invention will hereinafter become more fully apparent from the following description of the drawing, which illustrates a preferred embodiment thereof, and wherein.

Figure 4:
Figure 4 is an enlarged plan or elevational view of the artificial stem, shown broken away intermediate of its ends.

Referring more particularly to the drawing, wherein like reference characters designate like or corresponding parts throughout the different views, and referring particularly to Figure 4, 10 designates the artificial flower stem in its entirety and which includes a relatively stiff core 11 which extends from end to end thereof and which is preferably formed from a strand of relatively heavy gauge wire which is bent back upon itself, intermediate of its ends. A textile covering 12 is suitably attached to the strand 11 and substantially encloses the strand from end to end thereof. The covering 12 is provided with a fuzzy but relatively stiff exterior. The doubled back strand 11 forms the core of the artificial stem and acts as a reinforcement.

Figure 1:
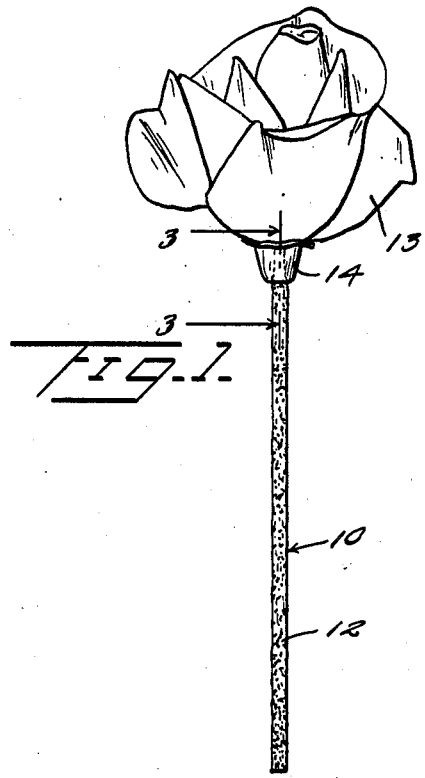
Figure 1 is an elevational view showing the artificial flower stem applied to a rose, from which the stem has been clipped.
Figure 3:
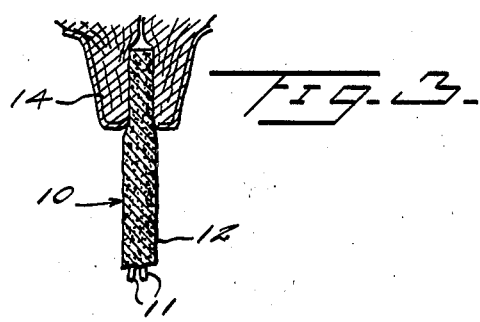
Figure 3 is an enlarged longitudinal sectional view taken substantially along the plane of the line 3—3 of Figure 1.

In Figure 1, a rose is shown at 13 having a calyx 14 from which the stem has been clipped. When applying the artificial stem 10 to flowers such as roses and carnations which have a heavy calyx, the stem of the flower is cut off immediately below the calyx. The flower is then held in one hand and the stem 10 is held in the other hand, close to an end thereof, and it is a simple operation to insert the stem 10 into the calyx, in which it is held firmly in place due to the fact that the fuzzy exterior of the covering 12 folds back on the stem as it is inserted into the calyx and effectively anchors itself therein, as seen in Figure 3, by resisting removal in the same manner as the barb of a hook. It will be readily obvious that the stem 10 can thus be quickly and easily applied and will produce a lifelike appearing stem, due to the fact that the textile covering may be dyed to any suitable color, such as various shades of green or white, to simulate natural flower stems, and will be strong and durable so as to fixedly dispose the flower, to which it is connected, in a corsage or bouquet so that it can not fall apart.

Flowers of a more fragile structure can also be handled quickly and neatly with the stem 10. Gladiolas, for instance, can be clipped off at the base and the stem 10 inserted in the hollow base of the flower, holding it firmly without splitting, which often results from transfixing the base of the flower with wire.

Figure 2:
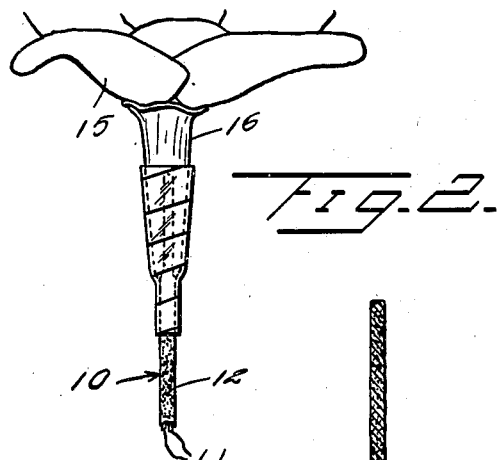
Figure 2 is a fragmentary elevational view showing the stem applied to a sweet pea, from which the natural stem has been clipped.

In Figure 2, the artificial stem 10 is shown applied to a sweet pea 15 by insertion into its calyx 16. This can be accomplished by the calyx 16 being splinted, as seen in dotted lines in Figure 2, for applying an end of the stem 10 thereto, after which the splinted portion of the calyx 16 and the portion of the stem 10 adjacent thereto are wrapped with Parafilm. It will be obvious that this method of applying an artificial stem to the sweet pea is much simpler and can be accomplished much more readily than by other methods heretofore known.

Various modifications and changes are contemplated and may obviously be resorted to, provided they fall within the spirit and scope of the invention as hereinafter defined by the appended claim, as only a preferred embodiment thereof has been disclosed.

I claim as my invention:

An artificial flower stem comprising a strand of relatively heavy gauge wire bent back upon itself intermediate of its ends and forming the core of the stem, and a textile covering on one end of the core and enclosing said end so attached as to enable insertion unitarily with the core into the flower, said covering having a fuzzy but relatively stiff exterior, said end of the stem being adapted to be inserted into a calyx of a natural flower, from which the natural stem has been clipped, said textile covering being compressed thereby and the fuzzy exterior thereof being pressed downwardly and away from the entering end of the stem so that it will function to resist withdrawal of the stem from the calyx.

ROBERT F. THOMAS.